(12) United States Patent
Russell

(10) Patent No.: US 6,429,610 B1
(45) Date of Patent: Aug. 6, 2002

(54) METHOD AND SYSTEM FOR REDUCING MOTOR VIBRATION BY CONTROLLING FLUX PRODUCING CURRENT

(75) Inventor: Timothy John Russell, Roanoke, VA (US)

(73) Assignee: General Electric Co., Schenectady, NY (US)

(*) Notice: Subject to any disclaimer, the term of this patent is extended or adjusted under 35 U.S.C. 154(b) by 31 days.

(21) Appl. No.: 09/655,771

(22) Filed: Sep. 5, 2000

(51) Int. Cl.[7] .............................................. H02P 5/408
(52) U.S. Cl. ........................ 318/114; 310/51; 318/460; 318/611
(58) Field of Search ................................ 318/114, 128, 318/460, 611, 629, 702, 799; 310/51

(56) References Cited

U.S. PATENT DOCUMENTS

| | | | | |
|---|---|---|---|---|
| 4,320,332 A | * | 3/1982 | Sugimoto | 318/798 |
| 5,610,490 A | | 3/1997 | King et al. | 318/611 |
| 6,140,792 A | * | 10/2000 | Kameyama et al. | 318/685 |
| 6,229,234 B1 | * | 5/2001 | Lambert et al. | 310/81 |
| 6,259,224 B1 | * | 7/2001 | Smith et al. | 318/629 |

* cited by examiner

Primary Examiner—Burton S. Mullins
Assistant Examiner—Judson H. Jones
(74) Attorney, Agent, or Firm—Karl Vick; Kevin Duncan; Hunton & Williams

(57) ABSTRACT

The flux producing current limit of the motor control is adjusted to control the vibration of a motor. The flux producing current may be profiled in relation to the speed of the motor to compensate for excessive motor vibration.

23 Claims, 6 Drawing Sheets

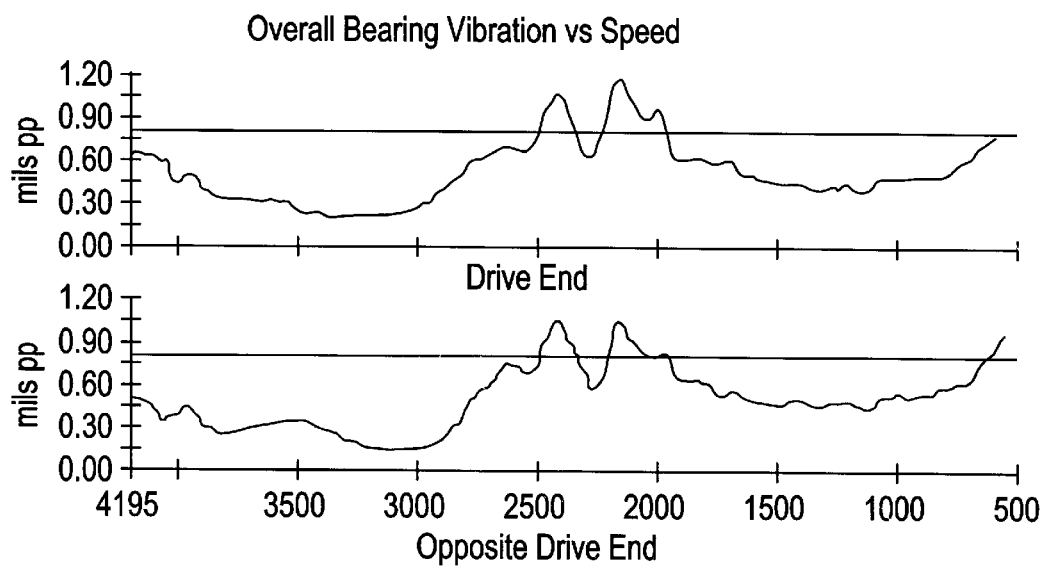
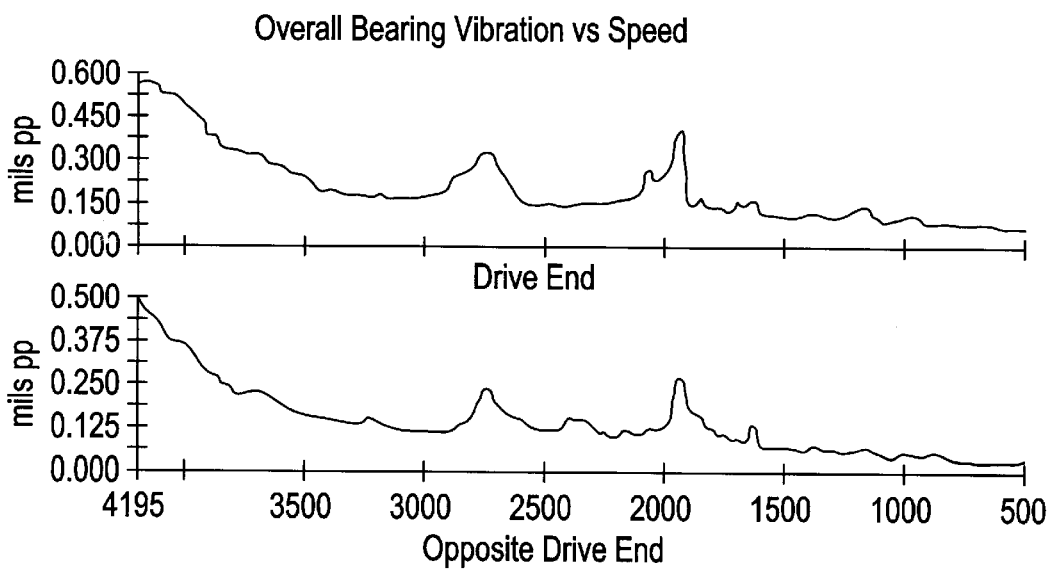

METHOD AND SYSTEM FOR REDUCING MOTOR VIBRATION BY CONTROLLING FLUX PRODUCING CURRENT

BACKGROUND OF THE INVENTION

The present invention is directed to a method and system for controlling a motor. In particular, the present invention is directed to controlling the vibration of a motor by controlling the flux producing current in the motor.

All electric motors experience some type of mechanical vibration. Mechanical vibration has been known to be a function of the speed of the motor as well as the resonant frequency of the motor structure.

Previous attempts to control motor vibration have included structurally revising the motor. This approach includes revising the stator core and frame to alter the resonant frequency and response of the motor. Another approach involves changing the stator core winding to operate with a different flux density and to reduce any flux asymmetries. A problem with this approach is the increased manufacturing and design costs of these alterations. Also, customizing and/or maintaining the mechanical tolerances of the motor is not often possible on a customized basis without incurring undue expense.

Another approach to this problem involves injecting a single phase current at a motor resonant frequency to act as a counter balance for flux asymmetries in the motor that are causing the vibration. Thee phase and amplitude of such an injected single phase current are determined by running the motor at the highest point of vibration and adjusting the phase and amplitude values until the lowest measured vibration level occurs. The second approach is limited by the response capabilities of the drive torque regulator that is applying the injected current. Additionally, such an injected current may create an undesirable h torque ripple that may affect the stability of outer speed and torque regulation control loops.

BRIEF SUMMARY OF THE INVENTION

The present invention controls vibration by altering the flux profile of a motor. The inventor understands that torque is created as a vector product of the applied flux producing and torque producing currents. The inventor came to the realization that, in some cases, motor vibration is largely dependent upon a flux producing current. The invention involves profiling the flux producing current throughout the operating speed range of the motor to control the motor vibration.

An embodiment of the invention controls the motor vibration while developing the rated torque of the motor. For example, if a motor vibration exceeds a desired level, the flux producing current may be reduced to reduce the motor vibration until the vibration falls below the desired level of vibration. For a variable speed motor, motor vibration may also be a function of the speed of the motor. In this instance, the motor vibration may only exceed a desired level at a given speed. In this case, the present invention reduces the flux producing current only within the speed range where the excessive vibration occurs. Again, the flux producing current is reduced in this speed range (or ranges) until the vibration level falls below the desired level. The torque producing current may also be increased to maintain the motor torque that may result from a reduction of flux producing current.

BRIEF DESCRIPTION OF THE DRAWINGS

The preferred embodiments of the invention will be described in detail, with reference to the following figures, wherein:

FIG. 1 shows two plots of a horizontal vibration level versus rotational speed of an exemplary motor operating with a full flux producing current;

FIG. 2 shows two plots of the vibration of the motor of FIG. 1 during an unpowered coast down;

These and other features of this invention are described in or arc apparent from the following detailed description of the preferred embodiments.

DETAILED DESCRIPTION OF THE INVENTION

Figure 3:
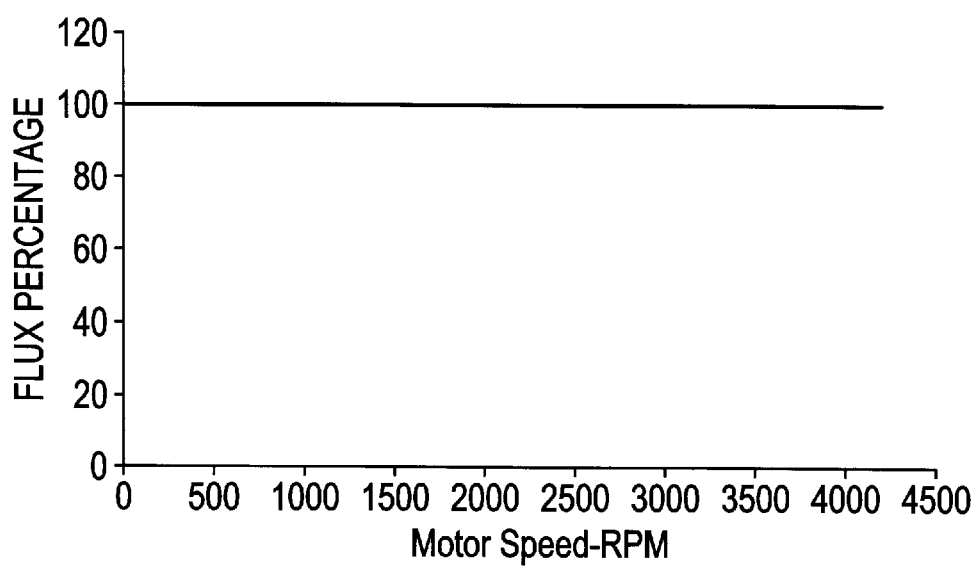
FIG. 3 shows a conventional fill flux profile for the motor of FIG. 1.

FIG. 1 shows a plot of the drive end and opposite drive end horizontal vibration measurements of an exemplary AC motor. The particular exemplary AC motor is a General Electric frame 509, 2 pole, 575 V adjustable speed motor rated at 460 horsepower absorption, 400 horsepower motoring, 2,000 rpm base speed and 4200 rpm top speed. In this particular example, the desired vibration level of the motor should not exceed 0.8 mils. However, FIG. 1 shows that vibration peaks appear above the 0.8 mil limit at 2100 and 2300 rpm. FIG. 2 shows the same first exemplary motor drive end and the opposite drive end motor vibration but in an unpowered coast down configurations FIGS. 1 and 2 demonstrate the difference in vibrations experienced by a motor when in powered and unpowered configurations. FIG. 3 shows the Conventional flux profile that was applied to the first exemplary motor and which resulted in the vibration measurements shown in FIG. 1.

The present invention provides the ability to apply a unique flux profile to each individual motor/control installation to accommodate variations which occur from manufacturing tolerances, the installation and the load on the motor.

Figure 4:
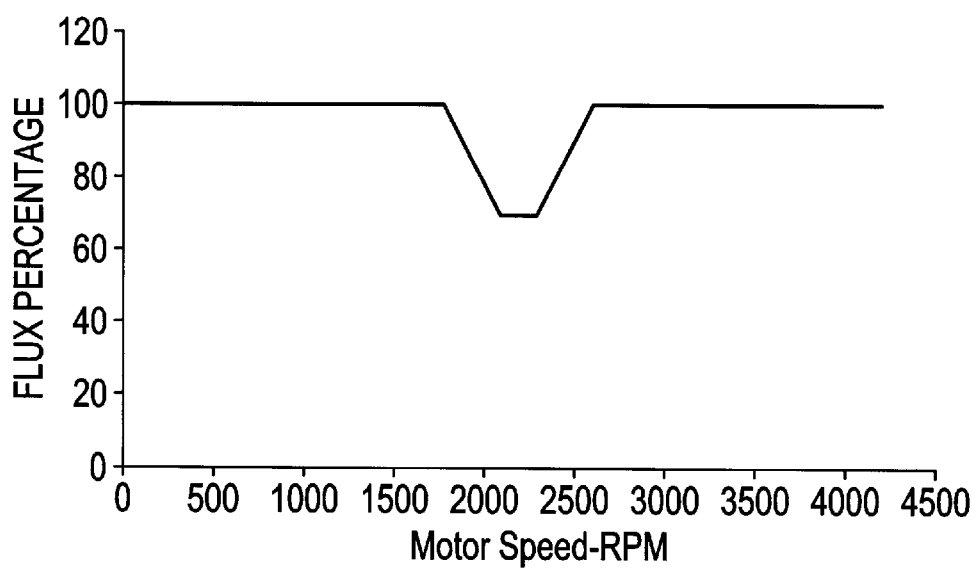
FIG. 4 shows a flux profile of a motor drive in accordance with the present invention.

In a first exemplary embodiment, the flux is profiled using a function generator within the motor drive control. FIG. 4 demonstrates the application of the present invention to the first exemplary motor. As shown in FIG. 1 the motor vibration exceeds the 0.8 mils requirement in the operating speed range of 2100 to 2300 rpm. To reduce the vibration level the flux profile is reduced within the 2100 to 2300 rpm speed range as shown in FIG. 4. By measuring the motor vibration versus flux current it was determined that a flux current limit of 70% of the maximum flux current would reduce the motor vibration to the desired levels. In the exemplary profile of FIG. 4, the flux current is ramped from the flux current limit of 100% at 1800 rpm to 70% at 2100 rpm and ramped from 70% at 2400 rpm back up to 100% at 2600 rpm. These ramps provide a smooth transition between the 100% and 70% levels to maintain a stable motor torque between 1800 and 2600 rpm.

Figure 5:
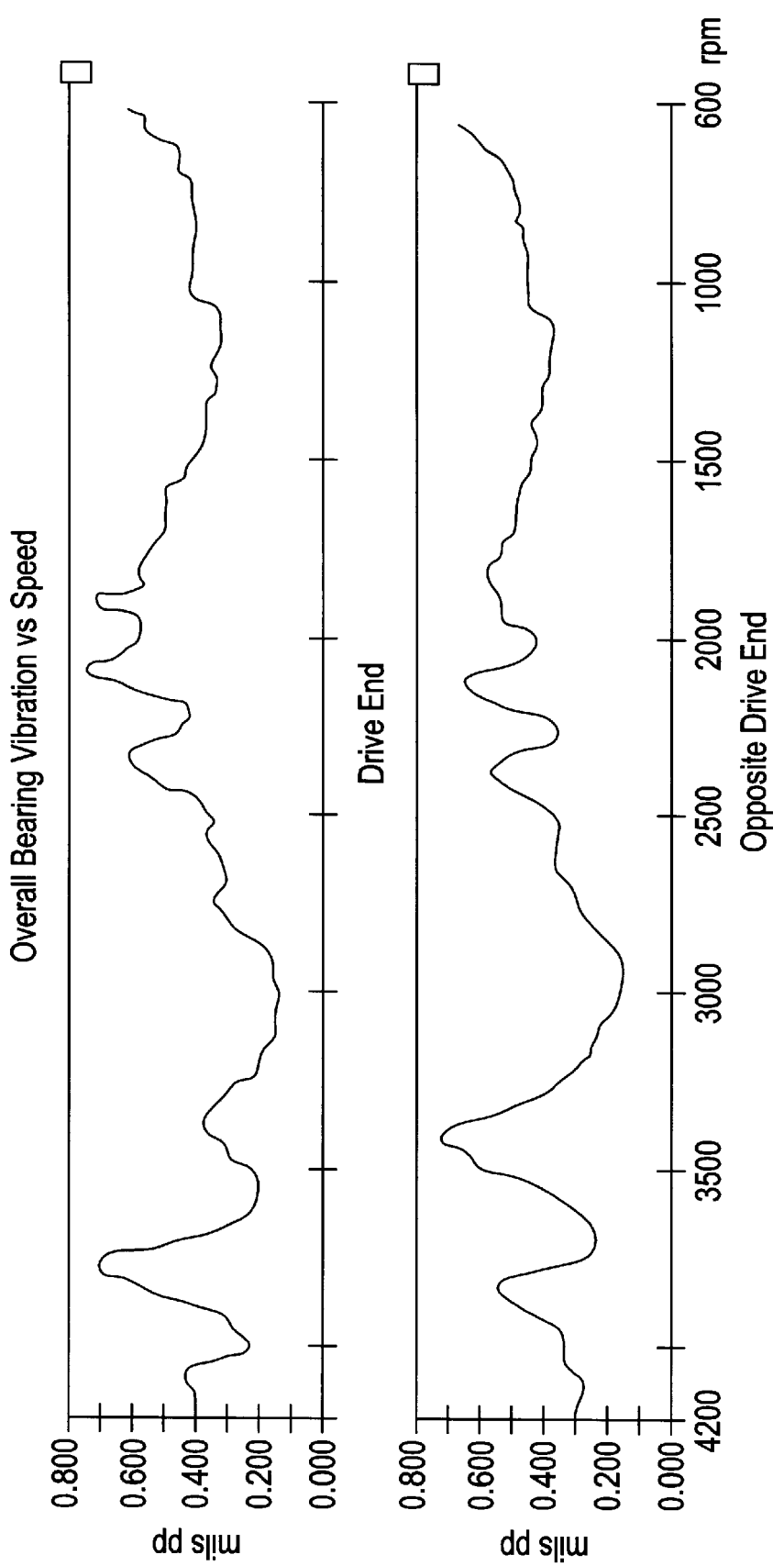
FIG. 5 shows two plots of the motor vibration of the same motor of FIG. 1 using the flux profile of FIG. 4 in accordance with the present invention.

FIG. 5 shows the results of the application of the flux profile of FIG. 4 to the first exemplary motor. FIG. 5 shows plots of the vibration of the drive end and the opposite drive end versus speed of the first exemplary motor with the profiled flux of FIG. 4 applied to the motor. FIG. 5 demonstrates that the application of the profiled flux reduces the vibration of the motor below the 0.8 mil level. In this first exemplary motor the torque producing current was increased to compensate for the affect on the torque of the motor that resulted from the flux producing current reduction. It is to be understood that if the torque rating of the motor is adversely affected by the profiled flux reduction used to reduce the motor vibration, then the torque producing current my be increased (up to the current limit of the motor winding) to offset the reduction in output torque.

Figure 8:
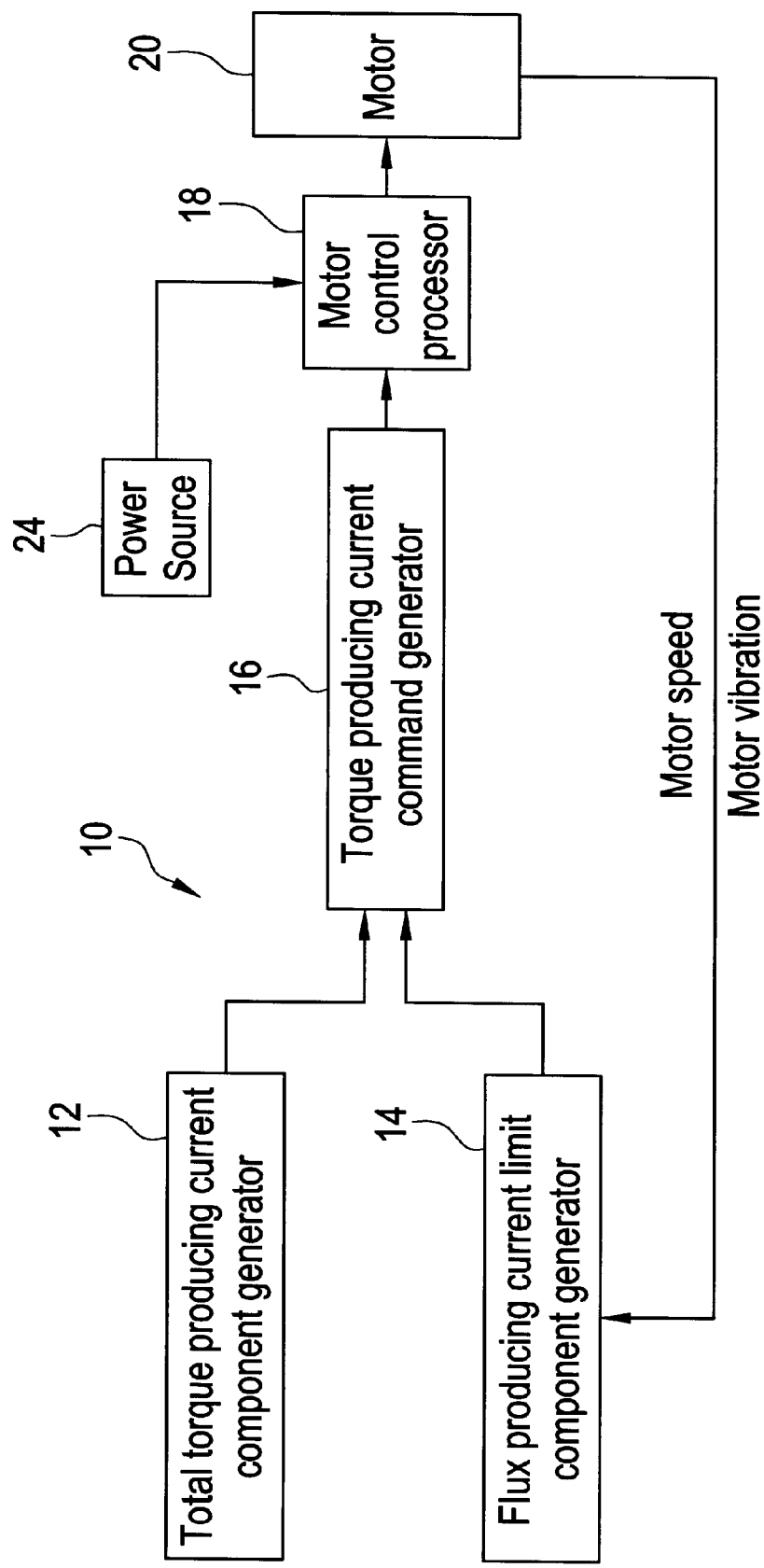
FIG. 8 is a schematic block diagram of the functional components of one portion of a motor controller in accordance with the present invention.

FIG. 8 is a schematic block diagram of functional components of a portion 10 of an exemplary motor controller in accordance with the present invention. The controller portion 10 includes a total torque producing current component generator 12, a flux producing current limit component generator 14, and a torque producing current command generator 16. While these components, 12–16, are found in conventional motor controls, the flux producing current limit component generator has been modified to practice the present invention.

Conventional flux producing current limit component generators merely provide a constant output below a rated voltage point. If the speed of the motor exceeds the rated voltage point, then the generator will provide a lower flux producing current component to maintain a constant motor voltage.

By contrast, the flux producing current limit component generator 14 of FIG. 8 produces an output that is at least partially based on the output that is required to maintain a desired linear vibration level as shown in FIG. 4 for exemplary motor 20, as shown in FIG. 8. The output of the flux producing current limit component generator is provided to the torque producing current command generator 16. The flux producing current limit component may be at least partially based upon the speed of the controlled motor. In this instance, the flux producing current limit component generator 14 may receive an input, as shown in FIG. 8, that is related to the speed of the controlled motor 20.

The torque producing current command generator 16 also receives an input from the total torque component generator 12. The total torque component generator 12 provides an output that regulates the total torque of the controlled motor and which is known to be a vector product of the motor flux and torque producing currents.

The torque producing current command generator 16 provides an output which is a torque producing current command. The torque producing current is a function of total torque component, which is the output received from the total torque producing current component generator 12, and the flux producing current component, which is received from the flux producing current limit component generator 14. In this exemplary embodiment, the torque producing current command is the ratio of the total torque component to the flux producing current component. The torque producing current command may then be further processed, i.e., in order to control the use (in motor 20) of power from a power source 24, by the motor control as by, for example, an inner core control (not shown). Such further processing by the motor control might be done by a motor control processor 18, for example, as shown in FIG. 8.

Figure 6:
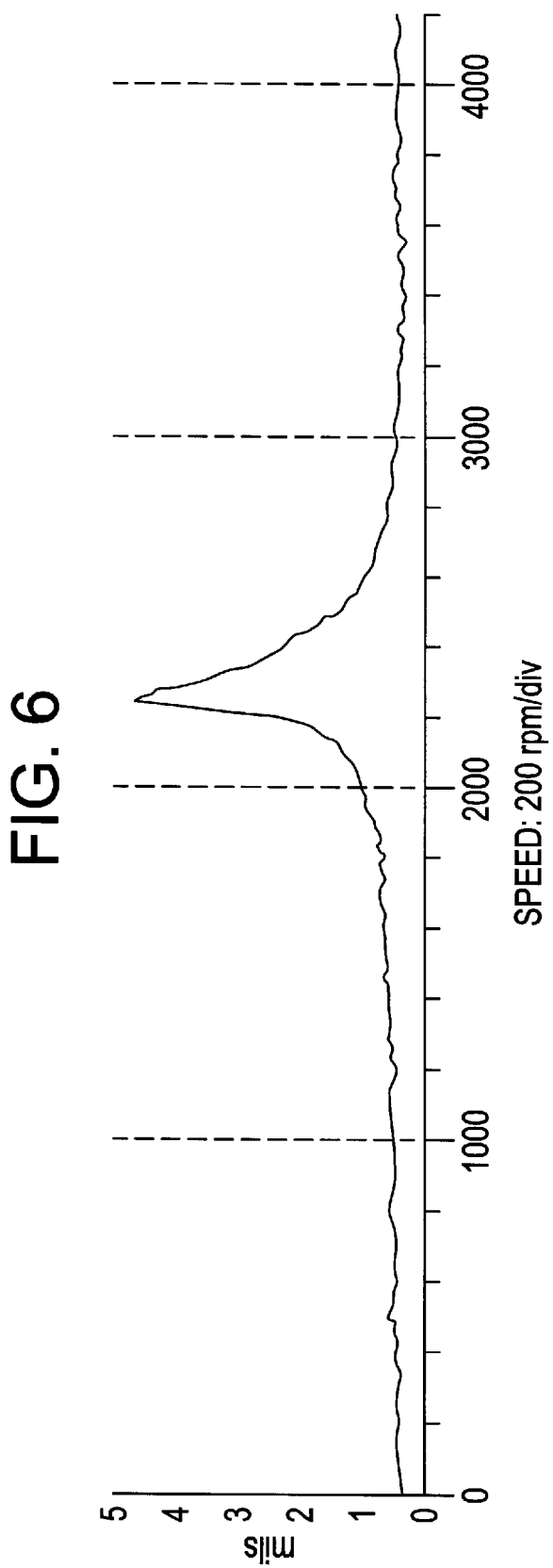
FIG. 6 is a plot of motor vibration in the horizontal direction versus rotational speed of a second exemplary motor.
Figure 7:
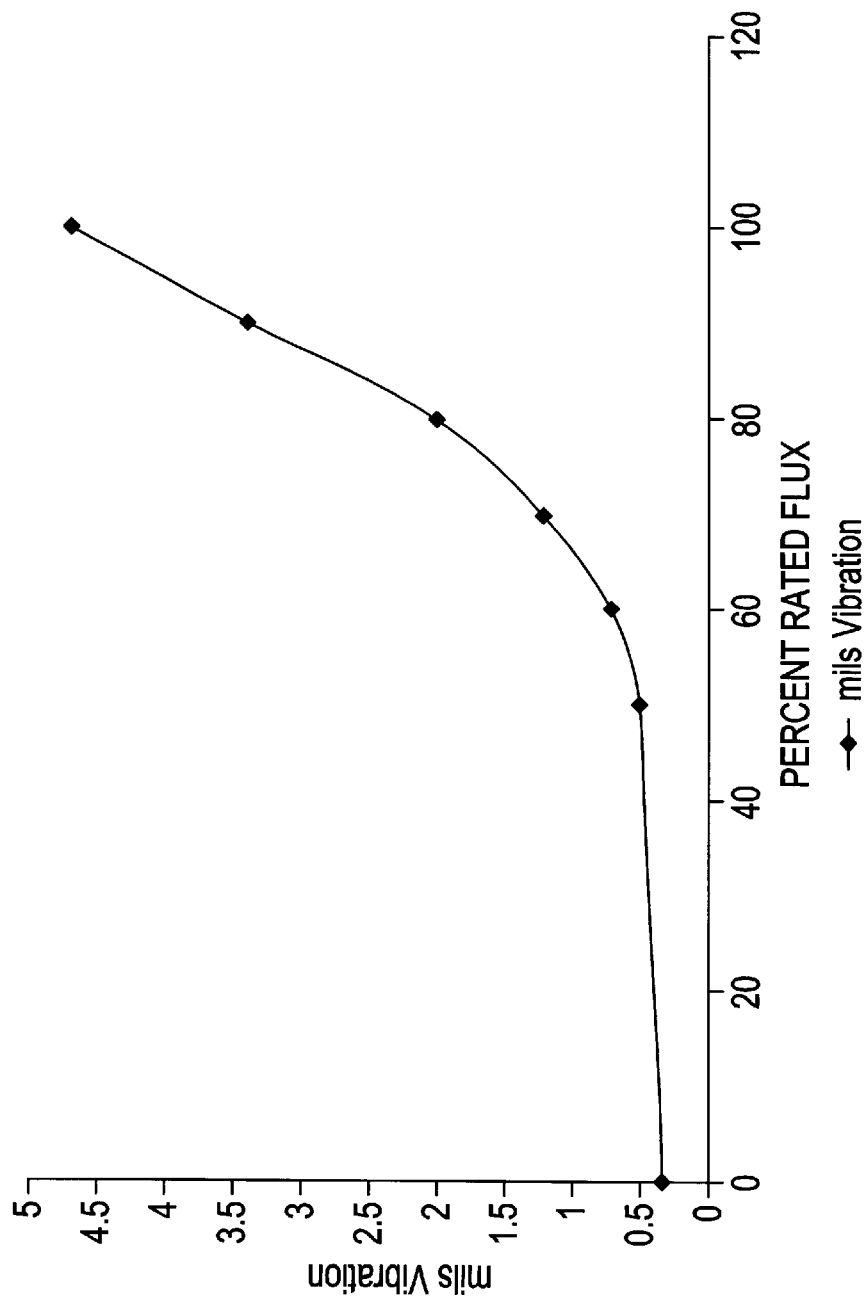
FIG. 7 is a plot of the applied profiled motor flux at 2250 rpm versus the motor vibration of the exemplary motor of FIG. 6.

The inventor also discovered that a reduction of the flux producing current may result in an exponential decay in motor vibration at certain levels. For example, FIG. 6 shows the motor vibration level of a second exemplary motor. The second exemplary motor is a General Electric frame 5011, 2 pole, 575 V adjustable speed motor, rated at 670 horsepower absorption, 600 horsepower motoring, 1750 rpm base speed and 4200 rpm top speed. FIG. 6 shows that this second exemplary motor experiences a peak vibration of 4.7 mils at 2250 rpm at fill flux producing current. FIG. 7 shows the effect of a reduction of flux producing current upon the motor vibration at 2250 rpm. The slope of the curve is quite high above 60 percent rated flux. Therefore, a small reduction in flux producing current results in a large reduction in the motor vibration. In this second exemplary motor, a reduction of a flux of approximately 20 percent results in a reduction of the motor vibration of approximately 57 percent from 4.7 mils down to 2 mils. Therefore, the flux producing current does not have to be drastically reduced in order to obtain a large reduction in motor vibration.

The present invention provides an easy and inexpensive method of controlling motor vibration. Application of the present invention can avoid expensive structural changes to a motor. Additionally, the present invention may reduce motor failures and warranty costs, increase bearing life, reduce the level of failures which occur to a motor foundation and any equipment connected to the motor and also reduce audible noise.

While the detailed description describes use of the present invention with adjustable speed AC motors, one of ordinary skill in the art understands that the present invention may also be applied to any other type of motor. Examples of other motors include: DC motors, high speed motors, dynamometers, test stands and in any other application where motor vibration should be controlled.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A method for controlling motor vibration, comprising the steps of:
   generating a total torque producing current component;
   generating a flux producing current limit component that is varied based upon a desired displacement vibration level; and
   generating a torque producing current command based upon said total torque producing current component and said flux producing current limit component.

2. The method of claim 1, wherein said vibration level is a displacement vibration level of the motor.

3. The method of claim 1, wherein said flux producing current limit component is reduced.

4. The method of clam 3, wherein said flux producing current limit component is reduced in a predetermined speed range.

5. The method of claim 4, wherein said predetermined speed range corresponds to a speed range where high motor vibrations occur.

6. The method of claim 3, wherein said flux producing current limit component is reduced in proportion to a desired reduction in motor vibration.

7. The method of claim 1, wherein sad flux producing current limit component is increased.

8. The method of claim 7, wherein sad flux producing current limit component is increased in a predetermined speed range.

9. The method of claim 8, wherein said predetermined speed range corresponds to a speed range where high motor vibrations occur.

10. The method of claim 7, wherein said flux producing current limit component is increased in proportion to a desired increase in motor vibration.

11. The method of claim 1, wherein said total torque producing current component is increased when the flux producing current limit component is decreased to maintain rated torque in the motor.

12. A motor vibration controller, comprising:
 a total torque producing current component generator;
 a torque producing current component generator in communication with said total torque producing current component generator, wherein said torque producing current command generator generates a torque producing current command; and
 a flux producing current limit component generator in communication with said torque producing current command generator, wherein said flux producing current limit component generator generates a flux producing current limit component that is varied based upon a desired displacement vibration level, and wherein said torque producing current command generator generates the torque producing current command based upon said total torque producing current component and said flux producing current limit component.

13. The controller of claim 12, wherein said vibration level is a displacement vibration level of the motor.

14. The controller of claim 12, wherein said flux producing current limit component generator reduces said flux producing current limit component.

15. The controller of claim 14, wherein said flux producing current limit component generator reduces said flux producing current limit component in a predetermined speed range.

16. The controller of claim 15, wherein said predetermined speed range corresponds to a speed range where high motor vibrations occur.

17. The controller of claim 14, wherein said flux producing current limit component generator reduces said flux producing current limit component in proportion to a desired reduction in motor vibration.

18. The controller of claim 14, wherein said torque producing current component generator increases said torque producing current limit component.

19. The controller of claim 12, wherein said flux producing current limit component generator increases said flux producing current component.

20. The controller of claim 19, wherein said flux producing current limit component generator increases said flux producing current component in a predetermined speed range.

21. The controller of claim 19, wherein said flux producing current limit component generator increases said flux producing current limit component in proportion to a desired increase in motor vibration.

22. A method for controlling motor vibration, comprising the steps of:
 generating a total torque producing current component;
 generating a flux producing current limit component that is varied based upon a desired displacement vibration level; and
 generating a torque producing current command based upon said total torque producing current component and said flux producing current limit component; and wherein said flux producing current limit component is reduced in a predetermined speed range.

23. A motor vibration controller, comprising:
 a total torque producing current component generator;
 a torque producing current component generator in communication with said total torque producing current component generator, wherein said torque producing current command generator generates a torque producing current command; and
 a flux producing current limit component generator in communication with said torque producing current command generator, wherein said flux producing current limit component generator generates a flux producing current limit component that is varied based upon a desired displacement vibration level, and wherein said torque producing current command generator generates the torque producing current command based upon said total torque producing current component and said flux producing current limit component; and
 wherein said flux producing current limit component generator reduces said flux producing current limit component in a predetermined speed range.

* * * * *